US010797899B1

(12) United States Patent
Feeney et al.

(10) Patent No.: US 10,797,899 B1
(45) Date of Patent: Oct. 6, 2020

(54) REGIONCAST TRAFFIC DELIVERY

(71) Applicant: L3 Technologies, Inc., New York, NY (US)

(72) Inventors: Michael S. Feeney, Farmington, UT (US); Matthew J. Reimann, Draper, UT (US); Thomas R. Giallorenzi, Sandy, UT (US); Brian Thorp, Sandy, UT (US); Chad S. Komer, Tooele, UT (US); Charles C. Hardy, Sandy, UT (US); Stephen M. Dudley, South Jordan, UT (US)

(73) Assignee: L3 TECHNOLOGIES, INC., New York, NY (US)

( * ) Notice: Subject to any disclaimer, the term of this patent is extended or adjusted under 35 U.S.C. 154(b) by 84 days.

(21) Appl. No.: 16/115,227

(22) Filed: Aug. 28, 2018

(51) Int. Cl.
  *G06F 15/16* (2006.01)
  *H04L 12/18* (2006.01)
  *H04L 12/733* (2013.01)

(52) U.S. Cl.
  CPC ........ *H04L 12/1845* (2013.01); *H04L 45/122* (2013.01); *H04L 45/126* (2013.01)

(58) Field of Classification Search
  None
  See application file for complete search history.

(56) References Cited

U.S. PATENT DOCUMENTS

2008/0022003 A1* 1/2008 Alve .................. G01S 5/0009
  709/229

OTHER PUBLICATIONS

BBN Technical Memo BBN-TM-1301, "Hazy Sighted Link State (HSLS) Routing: A Sclable Link-State Algorithm", C. Sativanez and R. Ramanathan, BBN Technologies, Cambridge MA, Aug. 2001.

* cited by examiner

*Primary Examiner* — Kouroush Mohebbi
(74) *Attorney, Agent, or Firm* — Workman Nydegger (57) ABSTRACT

Sending data on a network based on limiting the propagation of data based on a distance between a sender of the data and one or more receivers of the data. A method includes determining a maximum distance that a message should travel in a network from a sender to a receiver. The method further includes configuring a distance property or distance proxy property conforming with the determined distance. The method further includes sending the message by transmitting the message in a fashion that causes the message to be carried on the network in compliance with the configured distance property or distance proxy property.

22 Claims, 5 Drawing Sheets

REGIONCAST TRAFFIC DELIVERY

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections.

As noted, computer systems are configured to communicate with each other on communication networks. In particular, computer networks can be used by nodes (e.g., computer systems) in the network to send messages to other nodes. This can be accomplished in a number of different fashions. For example, traditional network traffic is generally classified as falling into one of three categories, as described below. The first category is unicast traffic. Unicast traffic is from a single source to a single destination located anywhere within the network. That is, one node sends one or more messages to another specific, prespecified node in the communication network. While a unicast message may need to be relayed by multiple intermediate relay nodes between the source node and the destination node if the source and destination do not have a direct connection between them, the intermediate relay nodes do not consume the information in the message. They merely retransmit the message (i.e., pass it along) so that it ultimately reaches the destination node. A second category is multicast traffic. Multicast traffic is from a single source to multiple destinations located anywhere within the network where the multiple destinations are predetermined and with traffic being routed specifically to the multiple destination nodes. Normally, the destinations are determined only by a destination multicast address and nodes can register to join getting that traffic. In multicast traffic, not all nodes are intended to consume the information in the messages, but rather only those nodes designated to receive the messages. This can change based on nodes joining and leaving the group. The traffic is only required to be sent, for consumption, to all nodes in the group. Like with unicast traffic, multicast traffic may be relayed by intermediate relay nodes to reach the set of end destination nodes. The relay nodes will retransmit the message but should not consume the information in the message. A third category is broadcast traffic. Broadcast traffic is single source, but where the destination is every node within the network. That is, every node in the network is intended to consume the information in the broadcast messages.

Each of these types of traffic has various challenges and drawbacks. Unicast traffic has the problem of finding the best path through the network to the destination. For multicast traffic, bookkeeping must be performed to find the best (optimal) paths from the source node to the set of destination nodes. Using suboptimal paths to deliver multicast traffic can result in inefficient usage of the available network bandwidth. Multicast usually requires a lot of bandwidth still to get the data through the network to all nodes that want to receive it. Bookkeeping is also required to manage nodes joining in and leaving the group, changing the dissemination of the data. Broadcast traffic has the drawback of using an inordinate amount of bandwidth to get data to every node. For example, a message will need to be transmitted, received, and retransmitted multiple times to ensure that the message is available to all nodes on the network. This may result in wasted bandwidth, and even energy, if not all nodes in the network can make use of the data in a broadcast message. Essentially, it is desirable to deliver each type of traffic in an efficient manner to reduce unnecessary use of network resources.

Thus, there is a need for an improved messaging system that can provide messages to appropriate nodes in the network, while simplifying bookkeeping overhead and reducing the amount of bandwidth and/or energy needed to send the messages as compared to previous systems. For example, in networks whose data rates are limited, there is a need for network-level traffic engineering mechanisms to manage the impact of periodic information dissemination.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of sending data on a network based on limiting the distance that the data travels between the sender of the data and a receiver of the data. Note that 'sender' here refers to the original source of the data, not to intermediate relay nodes. The method includes determining a maximum distance that a message should travel in a network from a sender to a receiver. The method further includes configuring a distance property or distance proxy property conforming with the determined distance. The method further includes sending the message by transmitting the message in a fashion that causes the message to be carried on the network in compliance with the configured distance property or distance proxy property.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein illustrate methods and apparatus for implementing a new communication method referred to herein as "regioncast", for controlling the rate at which some traffic is delivered within a communications network to recipients (e.g., intermediate/destination nodes) based on their distance from the originating source node. In some embodiments, the arrival rate of regioncast traffic will decrease with increasing distance from the originating source node. Note that regioncasting is a term used herein, but is not currently a widely recognized type of data delivery. Also note that there are two general types of regioncasting, one where all packets are limited to a certain 'distance' and another where distance determines the rate at which messages are delivered. Note that the first type of regioncasting can be viewed as a particular subset of the second type of regioncasting, but where the rate is zero beyond a particular 'distance'. Thus, in general, the description is directed to the second type of regioncasting, i.e., where message rate is limited by distance, but includes examples of the first type, i.e., where messages are prevented from traveling beyond a given distance, in the context of the second type.

Intermediate/destination nodes that are closer to the originating source node will receive regioncast messages more frequently than intermediate/destination nodes that are farther away from the originating source node. That is, regioncast traffic, in some embodiments, is single source where the destination is potentially every node within the network or multiple destinations located anywhere in the network, where rate of arrival varies according to the intermediate/destination node's distance from the originating source node. In some embodiments, the rate of arrival for some intermediate/destination nodes may be zero when there is a desire to create traffic that is only available to intermediate/destination nodes within a given distance.

Note that as used herein, distance may mean a number of different things. For example, in some embodiments, the distance is a logical distance. One example of a logical distance is a number of hops that a message is allowed to make in a communication network. In other embodiments, distance may be a physical distance between a sender and receiver. However, in some embodiments, logical distance may be a proxy for physical distance.

As will be illustrated in more detail below, enforcing the distance may be accomplished in a number of different ways, some of which require strict enforcement, while others allow for more variability. For example, in some embodiments distance that data is allowed to travel may be carefully controlled by knowing the location of nodes in the communication network. Some such embodiments may control the total distance a message has traveled. Thus, for example, the distance between every hop from one node to another node will be accumulated to determine the distance that a message has traveled. Other embodiments may control the net distance that a message can travel. For example, the physical distance between an intermediate/destination node and an originating source node will be used to determine if a message has traveled a particular distance.

Other embodiments may allow for more variability and estimated distances. In particular, some embodiments will use a distance proxy to determine physical distance. For example, if the average physical distance is known between hops between nodes, this average can be used to approximate the distance traveled for each hop that a message takes.

Some embodiments allow messages that are below a given distance threshold to be retransmitted one additional time even when that retransmission will cause the message to have traveled a distance exceeding the distance threshold. Thus, embodiments may have a threshold for retransmission, rather than a strict threshold for distance traveled.

Other embodiments may be configured to determine that retransmission of the message will cause the message to exceed the distance threshold, and thus prevent the message from being retransmitted to other intermediate/destination nodes.

Figure 1:
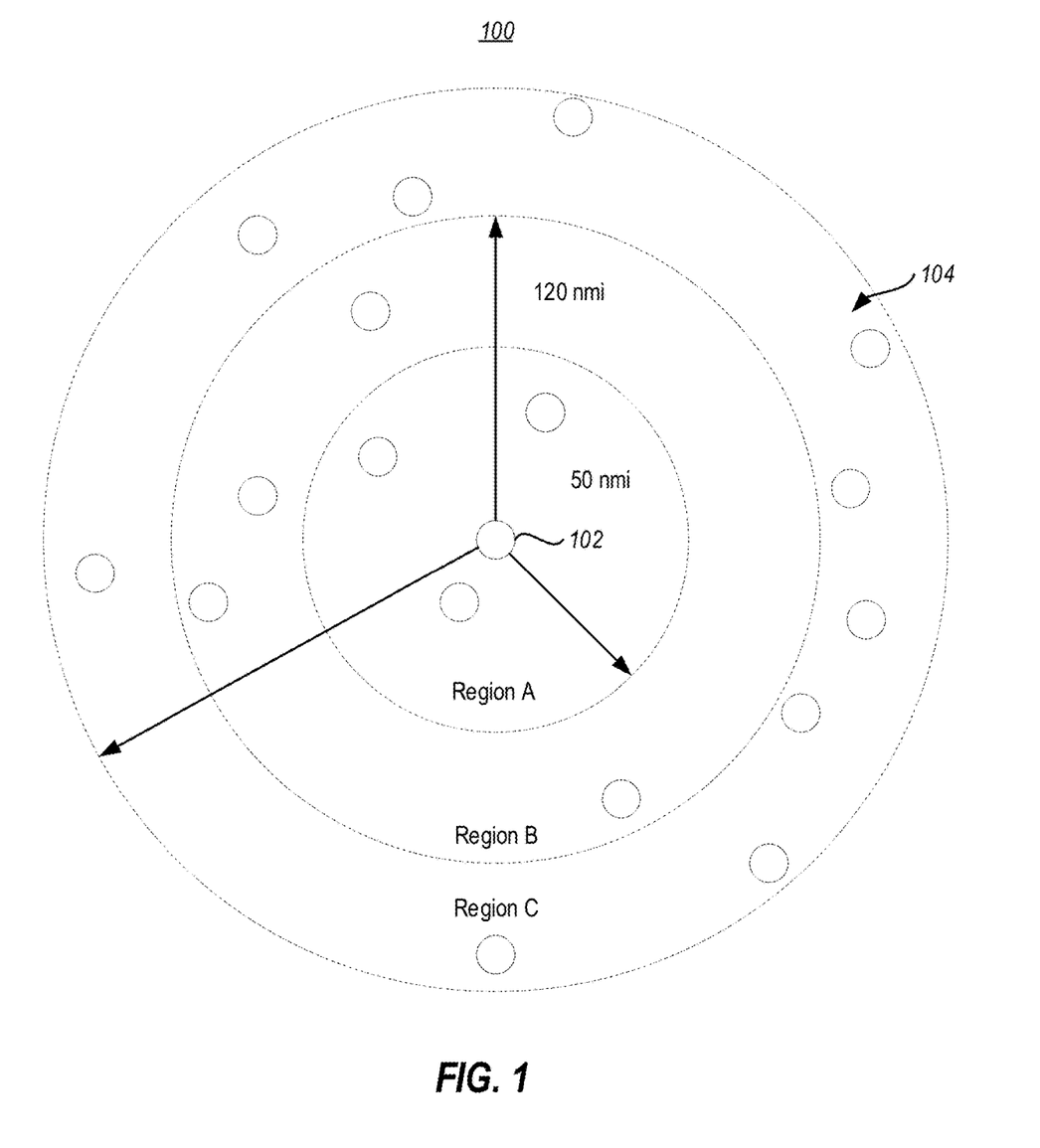
FIG. 1 illustrates a network for regioncasting messages such that message transmissions are limited based on distance from a sender to a receiver.

Referring now to FIG. 1, an example is illustrated. In the example illustrated in FIG. 1, a network 100 is illustrated. For purposes of the particular example, an originating source node 102 is illustrated, along with a plurality 104 of intermediate/destination nodes, which are indicated by crosshatching.

In the example depicted in FIG. 1, the originating source node 102 in the center of the network 100 periodically transmits messages. For purposes of the present example, the originating source node 102 is configured to periodically send a situational awareness (SA) message to the plurality 104 of intermediate/destination nodes in the network 100. An SA message is a message that notifies receivers of the location of the originating source node 102. Such SA messages will typically include a node identifier identifying the originating source node 102, a location identifying the location of the originating source node 102, and any other appropriate data. For example, the network 100 may be implemented in a battlefield environment where it is important that friendly nodes in the network 100 are aware of each other's location. This can prevent nodes in the network 100 from attacking friendly nodes in the network 100. Typically, an SA message will be sent from an originating source node 102 to various nodes in the network 100 on a periodic basis so as to update the various nodes in the network 100 with the location of the originating source node 102. Thus, while the example illustrated in FIG. 1 illustrates a single originating source node 102 and a plurality 104 of intermediate/destination nodes, it should be appreciated that each of the nodes in the plurality 104 of intermediate/destination nodes may themselves be originating source nodes in other examples so as to be able to notify other nodes in the network 100 of their location and other important data.

Returning once again to the present example, the originating source node 102 sends its SA messages periodically. For purposes of the present illustration, it is assumed that the originating source node 102 sends its SA messages once per second. Intermediate/destination nodes that have a distance, d, from the originating source node 102 where (in the present example) 0<d≤50 nmi, will want to receive SA update messages from the originating source node 102 every second. That is, these nodes do not want their SA information from the originating source node 102 to be out-of-date or "stale" by more than 1 second.

Intermediate/destination nodes that have a distance, d, from the originating source node 102 where 50 nm<d≤120 nmi, will want to receive SA update messages from the originating source node 102 once every five seconds. These nodes do not want their SA information from the originating source node 102 to be out-of-date by more than five seconds.

Intermediate/destination nodes that have a distance, d, from the originating source node 102 where 120 nmi<d≤200 nmi, will want to receive SA update messages from the originating source node 102 once every 10 seconds. These nodes do not want their SA information from the originating source node 102 to be out-of-date by more than 10 seconds.

Nodes that are further than 200 nmi away from the originating source node 102 have no interest in receiving SA information from the originating source node 102.

The originating source node 102 could accommodate the different SA message reception interval requirements by sending its SA messages using regioncast delivery as outlined above, and discussed in more detail below. In particular, the originating source node 102 could configure a distance property at the originating source node, and/or in messages sent by the originating source node, where the distance property conforms with the distance requirements.

The following now illustrates additional details and advantages of some embodiments of the invention.

In networks whose data rates are limited, there is often a need for network-level traffic engineering mechanisms to manage the impact of periodic information dissemination. Some embodiments, can include functionality which achieves this functionality. In particular, embodiments can save a significant amount of bandwidth in a network by using regioncasting. Without regioncasting, systems can waste network bandwidth.

As noted above, the rate of delivery of regioncast traffic, in some embodiments, varies according to the intermediate/destination node's distance from the originating source node. Previous traditional network traffic delivery mechanisms (unicast, multicast, broadcast) do not exhibit this behavior. While modifications could be made to such systems to achieve a similar behavior, such modifications might require significant node bookkeeping. Illustrating one example, to deliver traffic whose arrival rate varies according to the destination node's distance from the originating source node, a system would assign destination nodes to different multicast groups based on their distance to the originating source node and then use traditional multicast traffic delivery (layer 2 multicast forwarding or layer 3 multicast routing) to deliver the traffic to those nodes. The time between generation of consecutive messages at the originating source node would be different, based on the destination multicast group ID. Messages to multicast groups closer to the originating source node would have shorter inter-message generation times, whereas messages to multicast groups farther from the originating source node would have longer inter-message generation times. Rather than generating a single SA traffic flow, the originating source node would in effect be generating N separate SA traffic flows where N represents the number of different multicast groups (i.e., the number of different distance zone ranges). Each of these N traffic flows would have a different inter-message generation time and a different multicast destination address.

There are various issues that may arise in such a system. For example, node mobility can result in a member of a multicast group moving out of the geographical region assigned to that multicast group. Further, node mobility can result in a non-member of a multicast group moving into the geographical region assigned to that multicast group. This might require a node to terminate its membership in its previous multicast group upon leaving the geographical region associated with that multicast group and to subscribe to (i.e., join) the new multicast group (or be assigned to the new multicast group) upon entering the geographical region associated with the new multicast group. Thus, nodes might be required to detect their crossings of the various geographical regions' boundaries and then initiate a multicast group termination or join event at that time. For example, an airplane flying a circular flight path might continuously be ping-ponging back and forth between two or more different multicast groups.

In contrast, various embodiments of the current invention do not require the receiving nodes to dynamically alter their multicast group memberships based upon their current geographical location. Rather, some embodiments allow intermediate/destination nodes to make the decision on whether a traffic packet should be forwarded (retransmitted) or not, based upon knowledge that the intermediate/destination node has about the delivery requirements, where those delivery requirements are based on distance, for that packet or other message. The decision (to forward or not to forward) is made on a message-by-message basis at each intermediate/destination node.

Several different embodiments may be implemented. Examples of some possible implementations are illustrated below.

Figure 2:
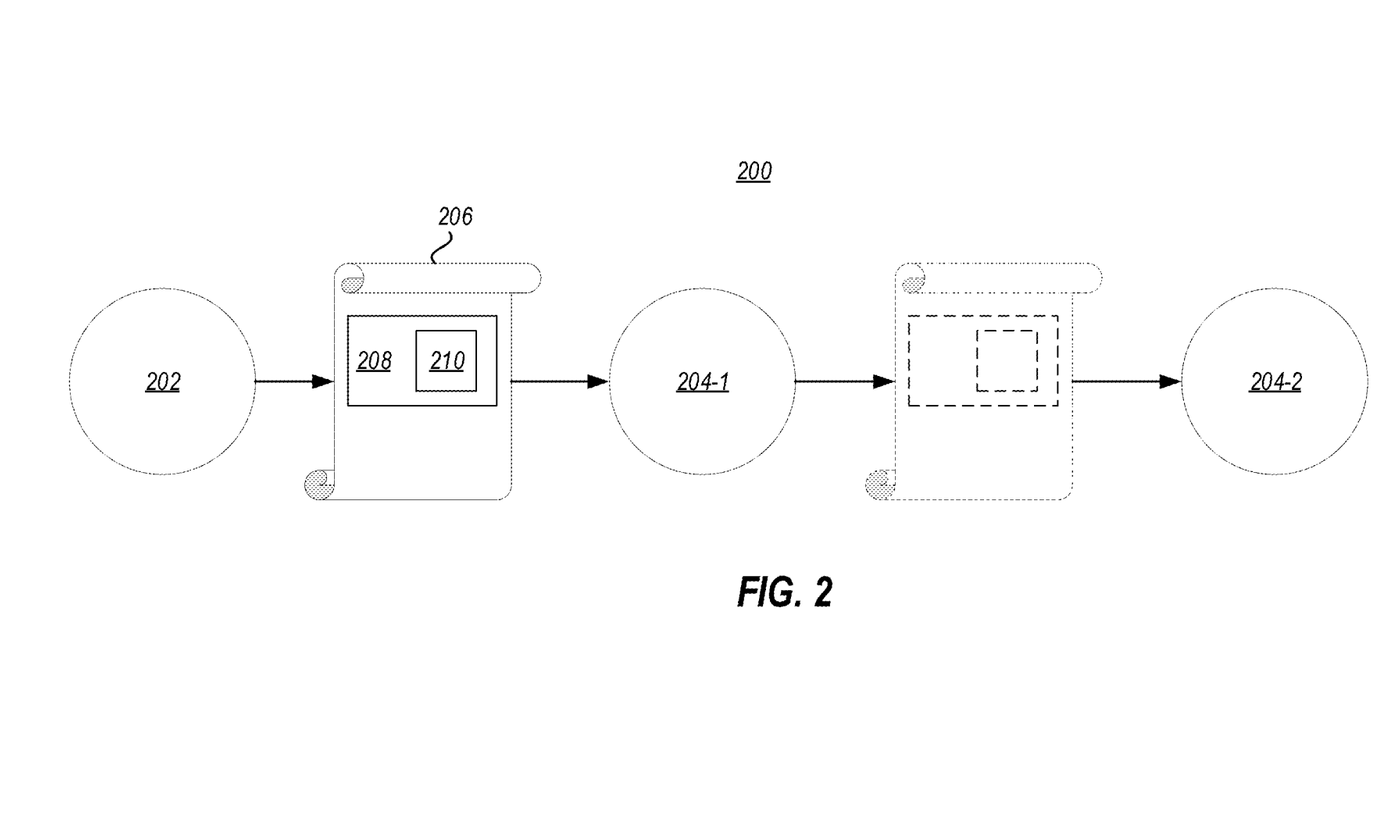
FIG. 2 illustrates limiting distance of regioncast messages by using a time-to-live parameter.

One embodiment implements an adaptive time-to-live (TTL) implementation. An example of this implementation is illustrated in FIG. 2. FIG. 2 illustrates that an originating source node 202 sends a message 206 to an intermediate/destination node 204-1. In this example, the message 206 is an IP packet. The message 206 includes an IP header 208. The IP header 208 of the IP packet contains a field 210 which dictates the total number of hops (relay events) that the packet is allowed to have. Thus, embodiments could configure a distance property or distance proxy property by configuring the number of hops. In this example, the number of hops is a proxy for distance. In particular, embodiments may estimate a distance that will be traveled based on the number of hops a message takes. In some embodiments, this may be computed by determining the average distance between nodes in a network.

The TTL field value is set by the originating source node, and this value is decremented by 1 at intermediate/destination nodes in conjunction with forwarding the message. Thus, for example, in the illustrated example, the intermediate/destination node 204-1 can evaluate the value of the TTL field 210. Based on the evaluation of the TTL field 210 value, the intermediate/destination node 204-1 can determine to decrement the value of the TTL field 210 and forward the message 206 to another intermediate/destination node illustrated as intermediate/destination node 204-2. Alternatively, if the intermediate/destination node 204-1 determines that the TTL field 210 contains a value that indicates that the message 206 should not be forwarded, then the node 204-1 can determine not to forward the message 206 to other nodes in the network.

For example, the packet illustrated by the message 206 is no longer forwarded (relayed) when the TTL field 210 value reaches zero. Traditionally, all packets within a particular traffic flow are assigned the same TTL value; consequently, all packets within the flow will travel the same number of hops across the network. However, by varying the TTL value for a particular traffic flow, on a packet-by-packet (or other message) basis, embodiments illustrated herein can cause packets that get assigned higher TTL values to travel further across the network (more hops) than packets that get assigned lower TTL values (fewer hops). In this manner, the frequency of packets reaching further away from the originating source node can be controlled.

For example, an originating source node configured to assign TTL field values according to a repeating TTL sequence of {2, 4, 2, 4, 2, 8} would result in one out of every six packets reaching nodes that are 8 hops away from the source. Three out of every six packets (or one-half) would reach nodes that are 4 hops away from the source. And every packet would reach nodes that are two hops away from the source. This implementation assumes a relationship between hop count and distance. Thus, hop count is used as a physical distance proxy.

In an alternative example, regioncasting may be implemented to configure a distance property or distance proxy property using the TTL field of an IP packet in a probabilistic fashion. For example, TTL field values may be assigned such that probabilistically 20% of all packets reach a given distance, 50% of all packets will probabilistically reach a given closer distance, and 100% of all packets probabilistically reach an even closer distance. For example, some embodiments may implement this functionality by implementing a pseudo random number generator. Typically, a pseudo random number generator randomly generates numbers between 0 and 1. Using the pseudo random number generator, if the pseudo random number generator generates a value at or below 0.2, then the TTL field 210 is assigned by the originating source node a value of 8. If the pseudo random number generator generates a value between 0.2 and 0.5, then the TTL field 210 is assigned by the originating source node a value of 4. If the pseudo random number generator generates a value between 0.5 up to, and including 1, then the originating source node assigns a value of 2 to the TTL field 210.

In yet another alternative or additional example, embodiments may enforce certain percentages. For example, embodiments may be configured to allow no more than 50% of messages to be sent to nodes at a particular distance. This may be accomplished by performing the probabilistic approach above, but enforcing limits.

Such embodiments may be applicable to any traffic flow (control-plane or data-plane) that is of a broadcast or multicast nature (i.e., non-unicast traffic).

Additional or alternative embodiments may be configured to implement distance-based implementations. For example, if the location (i.e., coordinates) of the other nodes in the network is available at each node, then an intermediate/destination node can use that location information to calculate the distance from the originating source node that a particular packet has already traveled. For example, nodes in the network may be configured to periodically broadcast location information to other nodes in the network. This distance can then be compared to the various regioncast thresholds, defined in distance properties in messages and/or at nodes in the network and a forward/do-not-forward decision can be made on the message. For example, if a packet has already traveled a distance of 90 nmi from its originating source node and the regioncast requirements are to deliver one-in-five messages at this range (or to receive a message generated once per second no later than every five seconds), then the intermediate/destination node could discard four of these packets in a row and forward (retransmit) every fifth packet.

Figure 3:
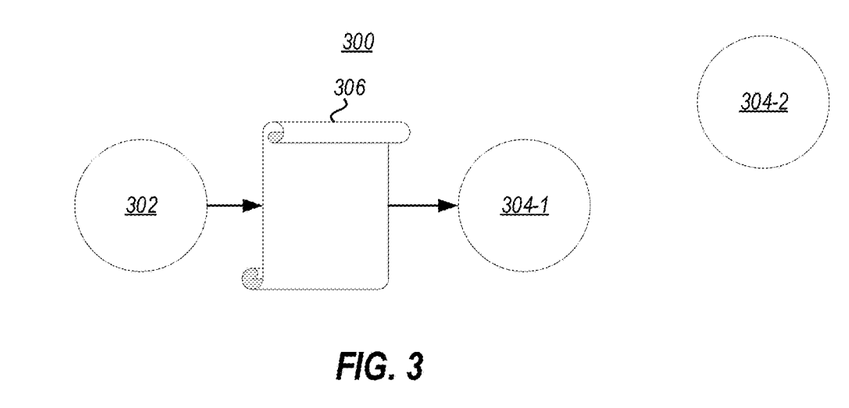
FIG. 3 illustrates limiting distance of regioncast messages by using known locations of nodes in a network.

Referring now to FIG. 3, an example is illustrated. FIG. 3 illustrates an originating source node 302 which sends a message 306 to intermediate node 304-1. Each of the nodes in the network 300 know the location of other nodes in the network 300. This may be accomplished by sending various SA messages, maintaining a database with locations of nodes in the network 300, or through other fashions. In the illustrated example, the intermediate node 304-1 may know the percentage of messages that it receives from the originating source node 302. Additionally, the intermediate node 304-1 may know the number of messages that should be received by the intermediate node 304-2, as defined by some distance property. The intermediate node 304-1 may be able to determine the frequency of messages that should be received from the originating source node 302 by the intermediate node 304-2 by knowing the distance between the originating source node 302 and the intermediate node 304-2. For the illustrated example, assume that the intermediate node 304-1 receives 100% of the messages sent by the originating source node 302. The intermediate node 304-1 can compute the distance between the intermediate node 304-2 to the originating source node 302. Based on this computation, the intermediate node 304-1 can determine, using a distance property for messages, the number of messages received from the originating source node 302 that are forwarded on to the intermediate node 304-2. For example, if the intermediate node 304-1 receives 100% of the messages from the originating source node 302, and the distance between the originating source node 302 and the intermediate node 304-2 indicates that the intermediate node 304-2 should receive 50% of the messages from the originating source node 302, according to a distance property in the message itself, or stored at one of the nodes (such as the intermediate node 304-1) then the intermediate node 304-1 will only forward 50% of the messages received from the originating source node 302 to the intermediate node 304-2.

Additional or alternative embodiments may be configured to implement adaptive Differentiated Services Code Point (DSCP) implementations. As a packet travels further across the network, its DSCP value can be adjusted downwards (from a higher priority to a lower priority). In general, lower priority traffic is expected to wait longer in queues than higher priority traffic. Additionally, data in lower priority queues will get dropped more often when the network is congested, leading to similar behavior as described above when distance and/or TTL is used. This approach is applicable to IP traffic or other traffic that has a DSCP or similar value. Thus, embodiments can be applied to non-IP traffic that carries some indication of packet priority.

Figure 4:
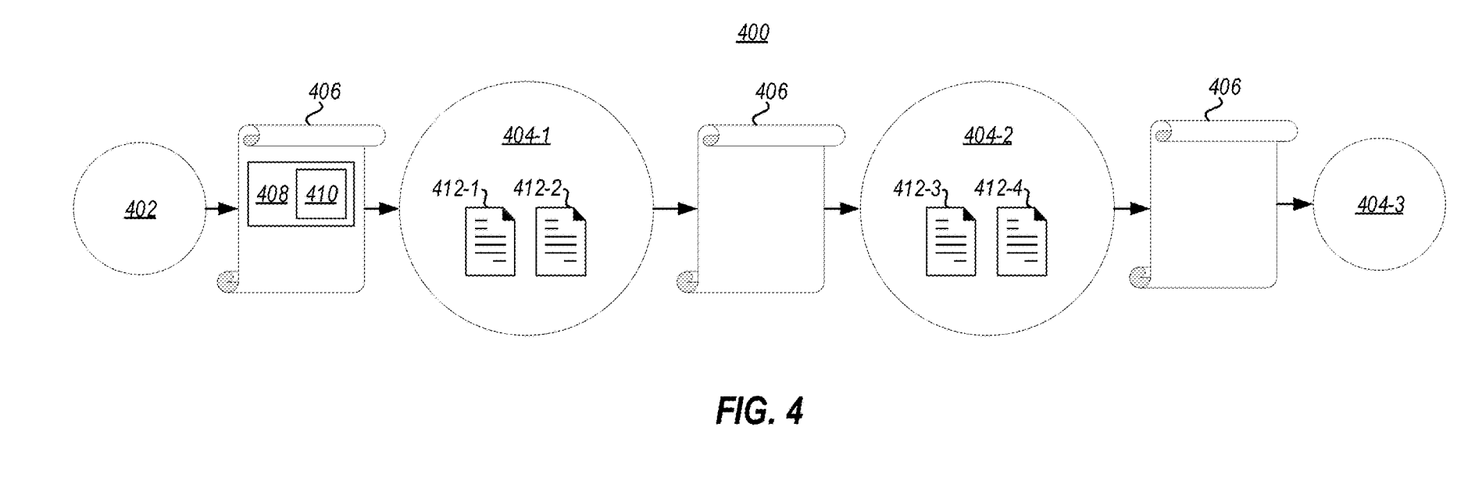
FIG. 4 illustrates limiting distance of regioncast messages by using prioritization messages.

Referring now to FIG. 4, an example is illustrated. In the example illustrated in FIG. 4 an originating source node 402 sends a message 406 to an intermediate/destination node 404-1. The originating source node 402 can configure the value of a priority property 410 (which may be the distance property or distance proxy property) in a header 408 of the message 406. Each intermediate/destination node in the network 400 may be configured to prioritize the message based on the priority property 410 and to adjust the priority property 410. For example, the originating source node 402 may configure the priority property 410 to indicate that the message 406 is a high-priority message and should be treated as such. This will result in the message 406 being placed in to a high-priority queue 412-1 at the intermediate/destination node 404-1. Note that the intermediate/destination node 404-1 also includes a low priority queue 412-2. However, because the message 406 has a priority property value set for high-priority, the message 406 is not placed into the low priority queue 412-2. Note that messages placed in the high-priority queue 412-1 are handled more quickly than messages placed in the low priority queue 412-2. The intermediate/destination node 404-1 may determine to forward the message 406 to another intermediate/destination node 404-2. The intermediate/destination node 404-1 decreases the priority by decreasing the priority property value in the header 408 before forwarding the message to the intermediate/destination node 404-2. At this point the value of the priority property 410 is sufficiently low that the intermediate/destination node 404-2 places the message 406 into a low priority queue 412-4 instead of a higher priority queue 412-3. Servicing of messages in the low priority queue 412-4 is longer than servicing of messages in the high-priority queue 412-3, as well as having a higher probability of getting dropped when the network is congested. Indeed, in the present example, servicing of the low priority queue 412-4 is lower than the servicing of messages in the high-priority queue 412-1 in the intermediate/destination node 404-1. This is done to ensure that messages are forwarded from the intermediate/destination node 404-2 less often than messages are forwarded from the intermediate/destination node 404-1. The intermediate/destination node 404-2 services the message 406 in the queue 412-4 by sending the message on to another intermediate/destination node 404-3. However, because the messages serviced from the low priority queue 412-4, the message 406 is sent less often to the intermediate/destination node 404-3 than the messages sent to the intermediate/destination node 404-2.

Additional or alternative embodiments may be configured to implement a destination node type implementation. The principle behind this approach is that some node types (for example, platform types) may not be interested in receiving certain types of messages or that the arrival rate might be dependent upon destination node type. An intermediate/destination node would forward a regioncast packet based on its knowledge of the node types that are reachable via its retransmissions.

Note that in some embodiments, a sender can send different types of traffic, generally referred to as "traffic flows". For example, a given node may be sending an email, a video stream, and a voice-over-IP call all at the same time. The node is sending three traffic flows (traffic flow 1 is the email, traffic flow 2 is the video stream, and traffic flow 3 is the voice-over-IP call). At a different time, the node may be sending fewer or more traffic flows. For example, when the voice call ends, the node is only sending two traffic flows.

In some embodiments, a node can choose to use regioncasting independently for each traffic flow it is currently sending out. For example, the node could choose to use regioncasting for traffic flow 1 and traffic flow 3, but not for traffic flow 2. Also, the type of regioncasting and the parameters associated with it can be independently chosen for each traffic flow. For example, the node could use the second type of regioncasting described above for traffic flow 1 with a maximum distance set to 50 miles, such that no messages in traffic flow 1 travel further than 50 miles. At the same time, the node could use the first type regioncasting (where that rates at which messages are delivered is controlled based on distance) for traffic flow 3, with the following parameters: deliver traffic flow 3 to nodes within 10 miles 100% of the time; to nodes within 30 miles 50% of the time; to nodes within 60 miles 10% of the time; and never beyond 70 miles. In some embodiments, the same type of regioncasting, but with different parameters may be used. Thus, different distances and/or percentages can be used for different traffic flows sent from the same node.

Thus, regioncasting can be enabled independently for each individual traffic flow that a node is sending out. And the regioncast parameters can be chosen independently for each traffic flow that is using regioncasting.

The implementation descriptions listed above are not intended to be exhaustive; other implementations may also be possible.

One example where regioncast is useful is in an airborne tactical communications network where nodes share situational awareness (SA) messages that contain their current location, ID, and possibly other status information. These messages are meant to propagate across the entire network so that every node will have current SA information about every other node in the network.

It is expected that a node will have a higher degree of interest in the SA information of nodes that are close by, and a gradually lesser degree of interest in the SA information of nodes that are farther away. For example, a pilot will have more time to react to events that occur farther away, whereas events that occur close by (another aircraft changing its heading or firing a weapon, for example) will give a pilot less time to react. Consequently, a pilot would want to receive SA updates at a faster rate for nearby nodes.

In another example, a regioncast network may be used for delivery of Push-to-Talk (PTT) voice traffic across a network. For example, there may be an environment where voice traffic is transmitted across the network. In some such embodiments, there may be a desire to only transmit voice traffic a certain distance. In particular, individuals on such networks may wish to communicate with other individuals within some small predetermined radius. Such embodiments may implement regioncast scheme where the frequency of messages sent within the radius is 100% and where the frequency outside of the radius is 0%. In an alternative or additional embodiment, the quality of voice data may be controlled based on distance. In particular, voice data may be included in several different packets. Having all packets allows for high quality voice data, where having less than all packets still allows the voice data to be received, but the voice data will be of a lower quality. Thus, higher quality data could be transmitted to closer nodes, and lower quality data transmitted to nodes further away.

In another example, the regioncast network may be used to implement delivery of streaming video traffic and/or streaming audio traffic across a network. As illustrated above, in some embodiments it may be desirable to only send data to nodes in the network that are within a particular radius of an originator node. Thus, data may be sent with 100% frequency within the radius and at 0% frequency outside that radius. However, other embodiments may allow for different qualities of data to be sent based on distance from an originator node. For example, consider a case where an originator node is disposed in an urban environment. The originator node is configured to distribute its streaming audio and/or video data. Surrounding the urban environment is a suburban environment. Surrounding the suburban environment is a rural environment. Population densities vary based on environment. For example, in the urban environment, population densities are higher than in the suburban environment. Population densities in the suburban environment are higher than population densities in the rural environment.

Thus, some embodiments may be configured to allocate network resources to service the highest number of consumers. For example, the regioncast network may be configured such that all packets are received within the urban environment. A smaller percentage of packets may be received in the suburban environment. An even smaller percentage of packets may be received in the rural environment. In streaming audio and video environments, receiving fewer packets may simply reduce the number of frames that are received. Thus, while consumers may nonetheless be able to watch a streaming video in the suburban and rural environments, that streaming video will be of lower quality than what is transmitted to the urban environment.

Some such embodiments may be configured to determine the number of packets delivered based on energy consumed. Thus, for example, if each packet delivered to a suburban environment consumes approximately twice the energy as a packet delivered to the urban environment, embodiments may reduce the number of packets delivered to the suburban environment by half. For example, some such embodiments may be implemented so as to attempt to equalize cost for all consumers. Thus, some consumers may receive degraded streaming data as compared to other consumers, but this is tempered by the fact that it costs more per packet to deliver those data packets to consumers receiving degraded data.

Some embodiments may be implemented in intelligence, surveillance, and reconnaissance (ISR) networking applications. For example, ISR data may need to be received more often by nodes closer to the sender, such as close air support or ground troops watching an ISR stream, whereas nodes further away may just need to receive the data less often to know about the sender, but with less precise update rates.

Delivery of Command and Control (C2) traffic across a network may use embodiments of the invention. C2 control might need to be updated more often and/or faster to close nodes, where nodes further away can receive data with much greater latency. Such data may include data changing mission goals, profiles, or updating location commands.

Extension of the regioncast approach to data-plane traffic provides for the opportunity to achieve increased network throughput, since a larger total number of unnecessary transmissions are eliminated. Most of the traffic in a network is data-plane traffic, with a minor amount of traffic being control-plane traffic. The ratio between data-plane traffic and control-plane traffic varies from network to network, but usually control-plane traffic often represents less than 20 percent of the total network traffic and thus data-plane traffic often represents 80% or more of the total network traffic.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
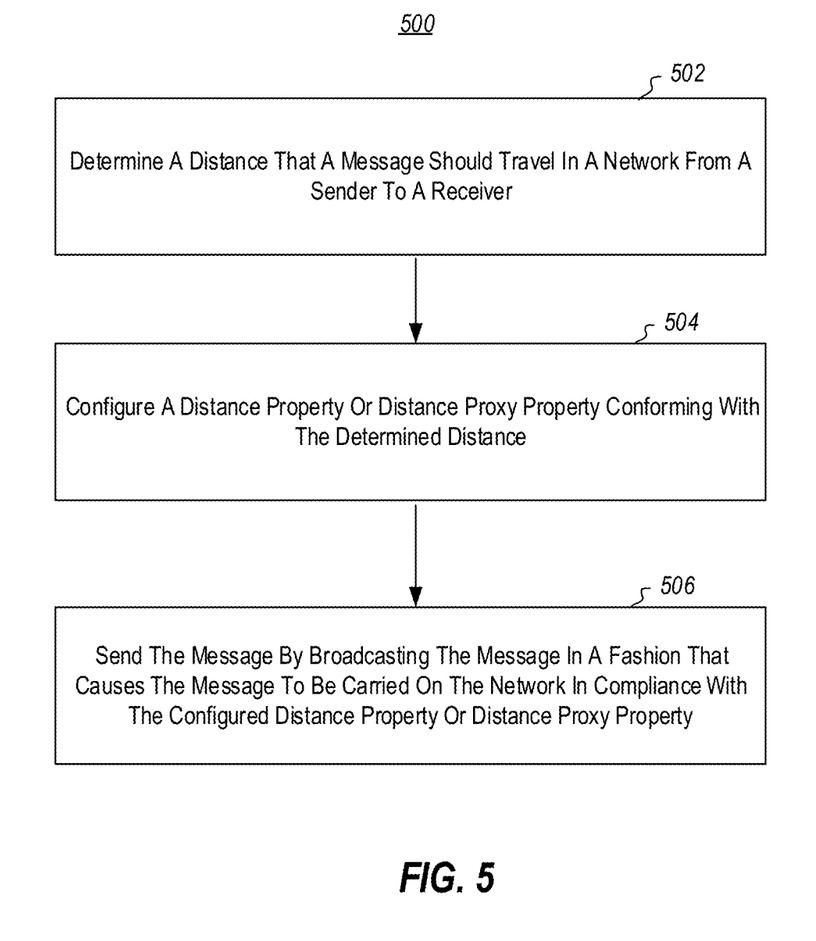
FIG. 5 illustrates a method of sending data on a network based on limiting data based on a distance between a sender of the data and a receiver of the data.

Referring now to FIG. 5, a method 500 is illustrated. The method 500 includes acts for sending data on a network based on limiting data based on a distance between a sender of the data and a receiver of the data. The method includes determining a maximum distance that a message (e.g., a packet) should travel in a network from a sender to a receiver (act 502). As noted above, the distance may be for example a physical distance and/or a logical distance.

The method 500 further includes configuring a distance property or distance proxy property conforming with the determined distance (act 504). For example, as illustrated above, a TTL property, physical distance property, priority property, or other appropriate property may be configured.

The method 500 further includes sending the message by transmitting the message in a fashion that causes the message to be carried on the network in compliance with the configured distance property or distance proxy property (act 506). For example, as illustrated above, TTL policies, priority policies, distance computations, etc. may be used to ensure compliance. Note that compliance is not necessarily hard compliance. For example, as noted above, some embodiments allow for a message to be retransmitted so long as the message has not already traveled a threshold distance but where the retransmission may cause the message to exceed the threshold distance. In this case, the first instance of the message exceeding the threshold distance causes the message to no longer be transmitted.

The method may be practiced where the distance comprises a logical distance, and the distance property or distance proxy property comprises a number of hops that the message is allowed to make in the network from a sender to a receiver.

The method may be practiced where the distance comprises a physical distance, and the distance property or distance proxy property comprises a number of hops that the message is allowed to make in the network from a sender to a receiver, where the number of hops approximates the physical distance. For example, embodiments may have information identifying the average distance between hops in a network. This average distance, along with a number of hops, may be used to estimate how far a message has travelled.

The method may be practiced where the distance comprises a physical distance, and the distance property or distance proxy property comprises a total physical distance that the message is allowed to travel in the network from a sender to a receiver. For example, even if a hop results in a net distance loss, nonetheless that distance will be counted against the total distance allowed to be traveled by a message. Thus, for example, every hop subtracts an amount of distance that the message is allowed to travel in the future.

The method may be practiced where the distance comprises a physical distance, and the distance property or distance proxy property comprises a net physical distance that the message is allowed to travel in the network from a sender to a receiver. For example, an intermediary node may know the location of the node that it intends to send the message to. The intermediary node will also know the location of the originator node. If the distance between the next node that it intends to send the message to and the originator node exceed the threshold distance, then the message will not be sent to the next node. Thus, in some embodiments, that actual distance between a sender and potential receiver will be used to determine if a message can be forwarded.

In some embodiments, a determination can be made that a distance has been exceeded. Some embodiments may include functionality for sending a message to a node that is closer to a sender to bring the distance back into compliance with the specified thresholds.

The method may be practiced where determining the maximum distance that a message should travel in a network from a sender to a receiver is based on a fixed distance for all messages in a particular set of messages for a particular sender. For example, this may be a case where no messages in a particular set of messages should travel beyond a certain distance.

The method may be practiced where determining the maximum distance that a message should travel in a network from a sender to a receiver is based on a distance for a pre-determined portion of all messages in a particular set of messages for a particular sender. For example, the pre-determined portion may be a pre-determined percentage (e.g., 20%) of all messages in a particular set of messages. Thus, as in illustrated in the examples above, 100% of the messages in the particular set of messages may go to nodes that are a short distance from the sender, 50% of messages in the particular set of messages may go to nodes that are an intermediate distance from the sender, and 20% of messages in the particular set of messages may go to nodes that are a longer distance from the sender.

In other or additional embodiments, the pre-determined portion may be a pre-determined interval (e.g., every 5th message) of all messages in a particular set of messages. Thus, for example, every message in the particular set of messages may go to nodes that are near the sender, every other message in the particular set of messages may go to nodes that are an intermediate distance from the sender, and every 5th message may go to nodes that are more distant from the sender.

In other or additional embodiments, the pre-determined portion may be a pre-determined frequency for receiving messages in a particular set of messages. For example, messages may be received according to some time interval. For example, every 1 second, a message may be transmitted to nodes that are more distant from the sender, while closer nodes receive messages more frequently.

Note that the particular set of messages described above may take any one of a number of different forms. For example, the set of messages may be all messages from a node. Alternatively or additionally, the particular set of messages may be all messages in a particular stream. Alternatively or additionally, the particular set of messages may be all messages of a particular protocol, or having particular header information. Although not enumerated here, other delineations may be used to define a particular set of messages.

The method may be practiced where the message comprises situational awareness information, including information about the location of the sender.

Figure 6:
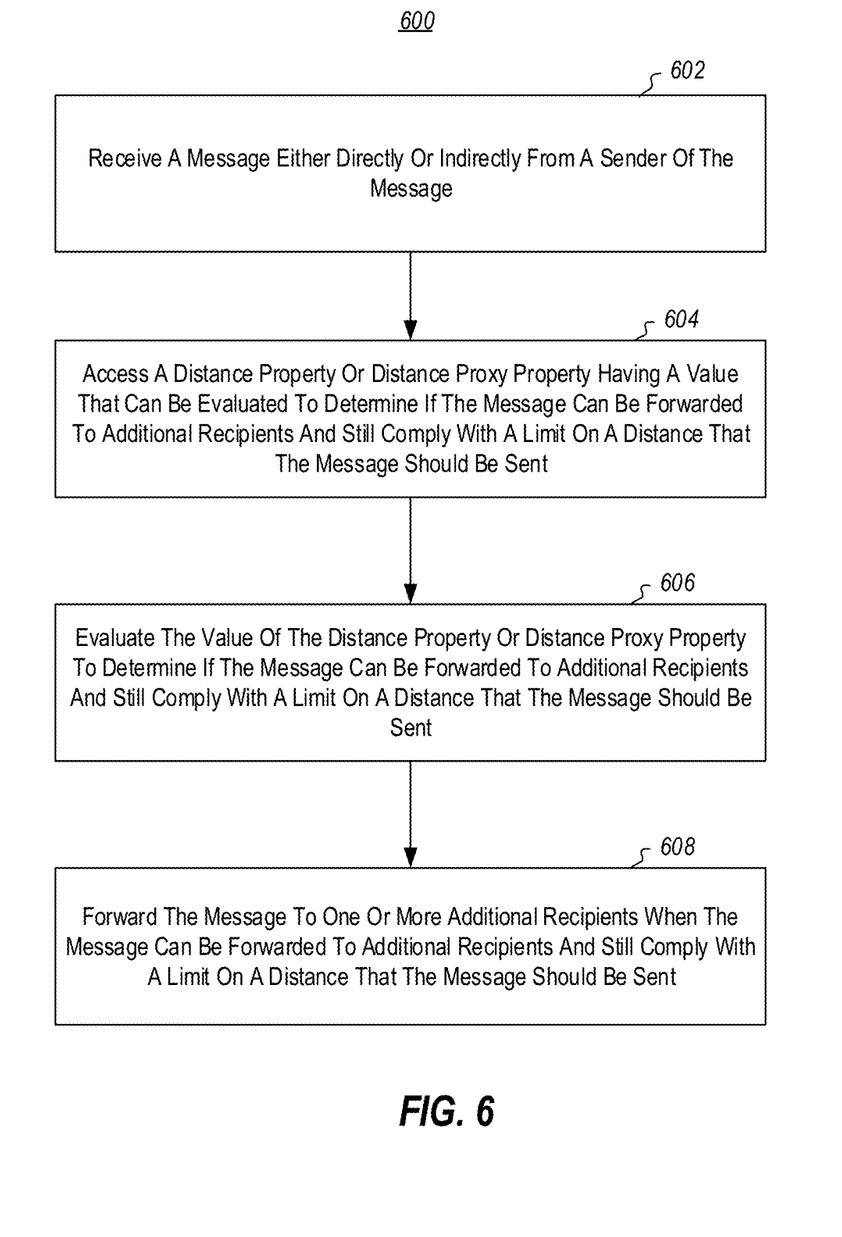
FIG. 6 illustrates a method of propagating distance limited data on a network to limit a distance between a sender of the data and a receiver of the data.

Referring now to FIG. 6, a method 600 is illustrated. The method includes acts for propagating distance limited data on a network to limit a distance between a sender of the data and one or more receivers of the data. The method includes receiving a message either directly or indirectly from a sender of the message (act 602).

The method further includes accessing a distance property or distance proxy property having a value that can be evaluated to determine if the message can be forwarded to additional recipients and still comply with a limit on a distance that the message should be sent (act 604).

The method further includes evaluating the value of the distance property or distance proxy property to determine if the message can be forwarded to additional recipients and still comply with a limit on a distance that the message should be sent (act 606).

The method further includes forwarding the message to one or more additional recipients when the message can be forwarded to additional recipients and still comply with a limit on a distance that the message should be sent (act 608).

The method may further include modifying the value of the distance property or distance proxy property as a result of determining to forward the message to one or more additional recipients such that the additional recipients can determine whether or not forwarding the message to yet additional recipients can be done and still comply with the limit on the distance that the message should be sent. For example, embodiments may decrement a TTL value or change a priority value.

In some embodiments, evaluating the value of the distance property or distance proxy property comprises evaluating a distance from an original sender of the message and comparing the distance to the value of the distance property or distance proxy property.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of sending data on a network based on limiting data based on a distance between a sender of the data and one or more receivers of the data, the method comprising:
    determining a maximum distance that a message should travel in a network from a sender to one or more receivers, wherein determining the maximum distance that a message should travel in a network from a sender to one or more receivers is based on a distance for a pre-determined portion of all messages in a particular set of messages for a particular sender;
    configuring a distance property or distance proxy property conforming with the determined distance; and
    sending the message by transmitting the message in a fashion that causes the message to be carried on the network in compliance with the configured distance property or distance proxy property.

2. The method of claim 1, wherein the distance comprises a logical distance, and the distance property or distance proxy property comprises a number of hops that the message is allowed to make in the network from a sender to a receiver.

3. The method of claim 1, wherein the distance comprises a physical distance, and the distance property or distance proxy property comprises a number of hops that the message is allowed to make in the network from a sender to a receiver, where the number of hops approximates the physical distance.

4. The method of claim 3, wherein the distance of each hop is equated to a known average physical distance between nodes.

5. The method of claim 1, wherein the distance comprises a physical distance, and the distance property or distance proxy property comprises a total physical distance that the message is allowed to travel in the network from a sender to a receiver.

6. The method of claim 1, wherein the distance comprises a physical distance, and the distance property or distance proxy property comprises a net physical distance that the message is allowed to travel in the network from a sender to a receiver.

7. The method of claim 1, wherein the pre-determined portion comprises a pre-determined percentage of all messages in a particular set of messages.

8. The method of claim 1, wherein the pre-determined portion is based on a pre-determined interval of all messages in a particular set of messages.

9. The method of claim 1, wherein the pre-determined portion is based on a pre-determined frequency for receiving messages in a particular set of messages.

10. The method of claim 1, wherein the message comprises situational awareness information, including information about the location of the sender.

11. The method of claim 1, further comprising determining one or more additional, different maximum distances based on distances for one or more additional pre-determined portions, wherein the one or more pre-determined portions are based on one or more different intervals.

12. The method of claim 1, further comprising determining one or more additional, different maximum distances based on distances for one or more additional pre-determined portions, wherein the one or more pre-determined portions are determined based on different data qualities.

13. The method of claim 1, further comprising determining one or more additional, different maximum distances based on distances for one or more additional pre-determined portions, wherein the one or more pre-determined portions are determined based on different energy consumptions for message delivery.

14. A method of propagating distance limited data on a network to limit a distance between a sender of the data and one or more receivers of the data, the method comprising:
    receiving a message either directly or indirectly from a sender of the message;
    accessing a distance property or distance proxy property having a value that can be evaluated to determine if the message can be forwarded to additional recipients and still comply with a limit on a distance that the message should be sent, wherein the distance property is based on a maximum distance that a message should travel in a network from a sender to one or more receivers, based on a distance for a pre-determined portion of all messages in a particular set of messages for a particular sender;

evaluating the value of the distance property or distance proxy property to determine if the message can be forwarded to additional recipients and still comply with a limit on a distance that the message should be sent; and forwarding the message to one or more additional recipients when the message can be forwarded to additional recipients and still comply with a limit on a distance that the message should be sent.

15. The method of claim 14, further comprising modifying the value of the distance property or distance proxy property as a result of determining to forward the message to one or more additional recipients such that the additional recipients can determine whether or not forwarding the message to yet additional recipients can be done and still comply with the limit on the distance that the message should be sent.

16. The method of claim 14, wherein evaluating the value of the distance property or distance proxy property comprises evaluating a distance from an original sender of the message and comparing the distance to the value of the distance property or distance proxy property.

17. A system for sending data on a network based on limiting data based on a distance between a sender of the data and one or more receivers of the data, the system comprising:

a computing system node comprising one or more processors, wherein the computing system node is configured to:

identifying a maximum distance that a message should travel in a network from a sender to a receiver wherein identifying the maximum distance that a message should travel in a network from a sender to a receiver is based on a distance for a pre-determined portion of all messages in a particular set of messages for a particular sender;

configuring a distance property or distance proxy property conforming with the determined distance; and sending the message by transmitting the message in a fashion that causes the message to be carried on the network in compliance with the configured distance property or distance proxy property.

18. The system of claim 17, wherein the computing system node is configured to create the message having a time-to-live field configured to cause the message to comply with the configured distance property.

19. The system of claim 17, wherein the computing system node is configured to compute a distance between an originating source node for the message and a next intermediate/destination node for the message, and wherein the computing system node is configured to send the message when the computed distance is below a predetermined value.

20. The system of claim 17, wherein the computing system node is configured to identify a percentage of messages that should be sent to a next intermediate/destination node, and wherein the computing system node is configured to send the message in compliance with the identified percentage of messages.

21. The system of claim 17, wherein the computing system node is configured to send situational awareness messages in compliance with the configured distance property or distance proxy property.

22. The system of claim 17, wherein the computing system node is a node in a streaming audio or video network.

* * * * *